(12) United States Patent
Emiliani et al.

(10) Patent No.: US 12,505,824 B2
(45) Date of Patent: Dec. 23, 2025

(54) ACTIVE NOISE CANCELLING SYSTEM AND METHOD FOR EXTERIOR NOISE REDUCTION

(71) Applicant: Bridgestone Europe NV/SA [BE/BE], Zaventem (BE)

(72) Inventors: Marco Emiliani, Rome (IT); Gaetano Fortunato, Rome (IT); Vincenzo Ciaravola, Rome (IT); Antonio Scarale, Rome (IT); Mattia Giustiniano, Rome (IT)

(73) Assignee: Bridgestone Europe NV/SA, Zeventem (BE)

( * ) Notice: Subject to any disclaimer, the term of this patent is extended or adjusted under 35 U.S.C. 154(b) by 217 days.

(21) Appl. No.: 18/035,449

(22) PCT Filed: Sep. 29, 2021

(86) PCT No.: PCT/EP2021/076875
§ 371 (c)(1),
(2) Date: May 4, 2023

(87) PCT Pub. No.: WO2022/069593
PCT Pub. Date: Apr. 7, 2022

(65) Prior Publication Data
US 2024/0005904 A1  Jan. 4, 2024

(30) Foreign Application Priority Data
Sep. 30, 2020  (EP) .................................... 20199297

(51) Int. Cl.
*G10K 11/178* (2006.01)
(52) U.S. Cl.
CPC .. *G10K 11/17883* (2018.01); *G10K 11/17815* (2018.01); *G10K 11/17857* (2018.01);
(Continued)

(58) Field of Classification Search
CPC ............... G10K 11/17857; G10K 2210/12821
See application file for complete search history.

(56) References Cited

U.S. PATENT DOCUMENTS

| | | | | |
|---|---|---|---|---|
| 6,192,133 B1* | 2/2001 | Enamito | .......... | G10K 11/17879 381/71.5 |
| 10,204,616 B1* | 2/2019 | Malka | .................... | H04R 1/028 |

(Continued)

FOREIGN PATENT DOCUMENTS

| | | |
|---|---|---|
| DE | 19900782 A1 | 7/2000 |
| EP | 3349210 A1 | 7/2018 |
| JP | 2019119375 A | 7/2019 |

OTHER PUBLICATIONS

International Search Report for corresponding application No. PCT/EP2021/076875, 4 pages, Dec. 14, 2021.

*Primary Examiner* — Ping Lee
(74) *Attorney, Agent, or Firm* — Patterson Intellectual Property Law, PC

(57) ABSTRACT

A system for vehicle exterior noise reduction, comprising: means for measuring amplitude and phase of exterior noise, which 5 propagates at least in part in a first direction from at least one exterior noise source of a vehicle, having an acoustic transmission path, wherein the exterior noise propagates at least in part under an underbody of the vehicle; means for calculating an out of phase signal based at least in part on the measured amplitude and phase of the exterior noise; and 10 means for generating an out of phase sound, based at least in part on the calculated out of phase signal, configured to cancel exterior noise; wherein the generated out of wave sound propagates at least in part in the first direction of the acoustic transmission path.

18 Claims, 4 Drawing Sheets

(52) U.S. Cl.
CPC ............... *G10K 11/17881* (2018.01); *G10K 2210/12821* (2013.01); *G10K 2210/3216* (2013.01)

(56) References Cited

U.S. PATENT DOCUMENTS

2005/0157890 A1* 7/2005 Nakajima ........ G10K 11/17857
381/92
2020/0160827 A1* 5/2020 Zafeiropoulos .. G10K 11/17854

* cited by examiner

ACTIVE NOISE CANCELLING SYSTEM AND METHOD FOR EXTERIOR NOISE REDUCTION

TECHNICAL FIELD

Field of Invention

This disclosure is generally directed to a system, method and computer program for active noise cancelling for exterior noise reduction of a vehicle.

Background

The exterior noise of a vehicle in motion is viewed by many as a characteristic sound, sometimes connected to the passion of a driver. For others, e.g. cyclists and pedestrians, the exterior noise of a vehicle may be important for perceiving approaching vehicles (especially from out of sight directions) early enough in order to react accordingly and take care, i.e., for reasons of road safety. However, on the other side, the presence of a plurality of wheeled vehicles such as trucks, cars and motorcycles cause considerable traffic noise. Especially in densely populated urban areas, constant noise may be a serious threat to people's health. Therefore, in some scenarios, it is desirable to reduce exterior noise of a vehicle in motion in a way that on one hand the noise pollution is reduced while on the other hand a driver is still able to enjoy the engine sound of the car and other road users such as cyclists and pedestrians crossing the street will be able to perceive approaching cars in time. Moreover, in order to reach a fast market penetration and therefore reduce traffic noise for as many people as possible in markets all around the world, a respective solution should be cost-efficient and easy to implement.

An active noise cancelling system can reduce undesired noise by generating out of phase sound waves with respect to incident wave of an undesired sound. In general, sound is a pressure wave, which consists of alternating periods of compression and rarefaction. A noise-cancellation speaker emits a sound wave with the same amplitude but with inverted phase to the original sound respectively the undesired sound. The combined waves cancel each other out by destructive interference.

While there have been various developments to reduce in-vehicle Noise (i.e. noise inside the vehicle) no solution exists capable of effectively reducing vehicle exterior noise (e.g. tire exterior noise). In particular, using active noise cancelling systems providing a predictive approach (i.e. based on numerical tire and road models) for noise cancelling are complex to implement. For example, problems may arise to accurate predict road roughness at a given time.

An example of such a predictive approach is for example disclosed in JP 2019 119375 A. In this document, it is for example disclosed that the control part is characterized by predicting the noise at the time when the tire contacts the position of the road face condition in which the tire discriminates in association with vehicle traveling to generate the muffling signal.

Moreover, in EP 3 349 210 A1, an active noise reduction apparatus for a vehicle comprising a detecting device configured to detect at least one reference signal which is indicative of at least one component of a noise generated at a contact area between a wheel of the vehicle and a track on which the vehicle is travelling, a sound emitting device for emitting sound waves towards the at least one contact area between the wheel of the vehicle and the track on which the vehicle is travelling, and a control device which is operatively coupled with the detecting device and the sound emitting device is disclosed. The control device is further configured to control the sound emitting device for emitting sound waves based on the detected at least one reference signal so as to reduce the at least one component of the noise through active noise cancellation by the emitted sound waves. In order to address the issue that some noise is important for road safety, the control device disclosed by EP 3 349 210 A1 may be configured to determine at least one exemption frequency from the detected at least one reference signal which is indicative of a characteristic road marking on the track on which the vehicle is travelling. The control device then controls the sound emitting device to not emit sound waves having the determined at least one exemption frequency. This approach however falls short in improving road safety for other road users outside of the car such as cyclists and pedestrians.

As mentioned, in practice, these systems are complex to implement. Moreover, these systems cancel noise even in directions where noise may be appreciated by other road users. This may reduce overall road safety especially for cyclists and pedestrians which in addition do not really have a crumple zone. Therefore, there is a need for simple and cost-efficient alternative solutions in order to reduce unwanted vehicle exterior noise in some directions while maintaining desired noise in others.

SUMMARY

The above objective is achieved by the present disclosure of a system, method or computer program for vehicle exterior noise reduction.

According to a first aspect, the invention provides a system for vehicle exterior noise reduction. The system may comprise means for measuring amplitude and phase of exterior noise, which may propagate at least in part in a first direction from at least one exterior noise source of a vehicle, having an acoustic transmission path, wherein the exterior noise may propagate at least in part under an underbody of the vehicle. The system may comprise means for calculating an out of phase signal based on the measured amplitude and phase of the exterior noise. In addition, the system may comprise means for generating an out of phase sound, based at least in part on the calculated out of phase signal, configured to cancel exterior noise, wherein the generated out of phase sound may propagate at least in part in the first direction of the transmission path, wherein the first direction is preferably perpendicular or substantially perpendicular to the direction of travel of the vehicle within a plane created by the underbody of the vehicle.

In general, the out of phase sound wave has the same amplitude, but inverted phase compared to the sound wave to be cancelled (e.g. unwanted exterior noise).

In addition, the exterior noise may also be referred to as exterior noise sound, unwanted noise or undesired noise, wherein the out of phase sound may also be referred to as out of phase sound wave, or destructive wave.

By generating the out of phase sound—based on the calculated actual noise, i.e., without the need for cumbersome and possibly imprecise predictions—propagating in a similar propagation direction (e.g. first direction of the transmission path) as the exterior noise, the out of phase sound is configured to cancel the exterior noise along this direction. Thus, the present invention provides an active noise canceling system capable to efficiently react to a measured amplitude and phase of exterior noise.

At the same time, the sound experience of the driver may not be affected by the system for vehicle exterior noise reduction. Moreover, in such a case, the exterior noise of the vehicle in directions other than the first direction is not cancelled. Therefore, on one hand, undesired exterior noise is reduced while noise in other desired directions is maintained. This is particularly important in connection with other road users such as cyclists or pedestrians (especially distracted people, children or disabled people, e.g. blind people) who rely on road noise in order to perceive approaching vehicles (especially from out of sight directions).

According to a further aspect, the means for measuring may comprise a microphone.

According to a further aspect, the means for calculating may comprise a controller.

According to a further aspect, the means for generating may comprise a speaker.

According to further aspect, the exterior noise source may be a tire of the vehicle, configured to generate exterior noise by tire-road interaction.

The present invention allows for cancelling exterior noise originated from the tires of a vehicle. In particular, the invention allows for cancelling exterior noise, which may propagate at least in part in a first direction of a transmission path, wherein the exterior noise may propagate at least in part under an underbody of the vehicle.

According to a further aspect, the means for measuring may be located along the first direction of the transmission path.

According to a further aspect, the means for measuring may be located at a position on the underbody of the vehicle.

According to a further aspect, the means for generating may be located along the first direction of the transmission path.

Advantageously, the out of phase sound can be generated in a distance to the exterior noise source. The exterior noise sound may travel along a first direction of the transmission path and passes the means for generating positioned along the first direction of the transmission path. Thus, the out of phase sound can be generated when the exterior noise passes the means for generating to cancel the exterior noise.

According to a further aspect, the means for generating may be located at a position on the underbody of the vehicle.

Thereby, the means for generating can be located in a distance to the exterior noise source and the means for measuring, wherein the exterior noise needs a certain time span to arrive at the means for generating. This time span can be used to measure the exterior noise and to calculate the out of phase signal.

In general, position of the means for measuring, in combination with the position of means for generating, may define the first direction of the transmission path, along which the exterior noise sound is measured, and the out of phase sound is generated. The ability to selectively locate the means for measuring and/or means for generating on the vehicle underbody provides selecting different directions of transmission paths along which the exterior noise may be measured, and the out of phase sound may be generated.

In general, multiple means for measuring/means for calculating/means for generating combinations may be arranged to cancel exterior noise in a plurality of directions from the at least one exterior noise source of a vehicle, having an acoustic transmission path, wherein the exterior noise may propagate at least in part under an underbody of the vehicle.

Further, additional means for measuring/means for calculating/means for generating combinations may also be arranged to cancel exterior noise in at least one direction from an additional exterior noise source of a vehicle, having an acoustic transmission path, wherein the exterior noise may propagate at least in part under an underbody of the vehicle.

According to another aspect, the means for generating may be located at a wheel arch edge.

According to another aspect, the means for generating may be located at a fender.

According to another aspect, the means for generating may be located at a bumper edge.

According to another aspect, the means for generating may be located at a side of vehicle.

According to a further aspect, the means for measuring may be located between the means for generating and the exterior noise source, and/or the means for measuring may be located closer to the exterior noise source than the means for generating.

By arranging the means for measuring between the means for generating and the exterior noise source, the exterior noise sound passes the means for measuring prior to the means for generating. Thus, a time span is provided for measuring the exterior noise and calculating the out of phase signal to generate the out of phase sound. As a consequence, the active noise cancelling system is able to generate an out of phase sound based on the measured exterior noise to be cancelled. In other words, the need for complicated and likely imprecise predictive analyses is avoided. Thus, the system may provide out of wave sound based on reacting to an exterior noise and not only based on predicting procedures.

According to a further aspect, the system may further comprise (i) second means for measuring amplitude and phase of the exterior noise, which propagates at least in part in a second direction from the at least one exterior noise source of the vehicle, having the acoustic transmission path, wherein the exterior noise propagates at least in part under the underbody of the vehicle, wherein the means for calculating the out of phase signal may be configured to calculate a further out of phase signal based on the measured amplitude and phase of the exterior noise propagating in the second direction, and/or the system may comprise (ii) second means for generating a further out of phase sound, based at least in part on the calculated further out of phase signal, configured to cancel exterior noise, wherein the generated further out of wave sound propagates at least in part in the second direction of the acoustic transmission path.

The use of second means for measuring allows measuring exterior noise propagating at least in part in an additional direction (e.g. second direction) compared to the first direction. In addition, the use of second means for generating allows generating further out of phase sound propagating at least in part in the additional second direction of the acoustic transmission path in order to cancel noise propagating in the additional second direction.

According to a further aspect, the means for calculating may calculate the out of phase signal, based at least on one of incident waves, system characteristics, vehicle exterior acoustics, position of the means for generating the out of phase sound, position of the means for measuring and/or an acoustic transmission path of the exterior noise.

The use of various parameters for calculating the out of phase signal, leads to an improved active noise cancelling efficiency.

According to another aspect, calculating may be based at least in part on vehicle exterior acoustics, which are calibrated for the vehicle.

Calibrating the vehicle exterior acoustics is beneficial, as the noise cancelling depends not only on the relative position of the means for measuring and means for generating, but also on the exterior acoustics of the vehicle itself. In particular, for a given configuration of the means for measuring and the means for generating, calculating the out of wave sound must also take into account the vehicle and its exterior acoustic. Calibrating the vehicle exterior acoustics provides setting information for the means for calculating with respect to a specific vehicle-noise cancelling system. However, if the vehicle or the noise cancelling system configuration changes, a new calibration is required.

According to another aspect, the means for calculating may calculate the out of phase signal in a computational time, which may be smaller than a transit time needed by the exterior noise, to arrive at the position of the means for generating.

In particular, the transit time represent the time span needed by the exterior noise to pass the distance between the means for measuring and the means for generating. Providing a computational time smaller than the transmit time enables the active noise cancelling system which to react to an exterior noise. Advantageously, if the computational time for calculating the out of phase signal is smaller than the transit time, the means for generating can generate the out of phase sound when the exterior noise (for which the out of phase signal is calculated) passes the means for generating. Thus, the generated out of phase signal is configured to cancel the exterior noise when passing the means for generating.

According to another aspect, the invention provides a method for vehicle exterior noise reduction, the method may comprise measuring amplitude and phase of exterior noise which propagates at least in part in a first direction from at least one exterior noise source of a vehicle, having an acoustic transmission path, wherein the exterior noise propagates at least in part under an underbody of the vehicle. The method may comprise calculating an out of phase signal based at least on the measured amplitude and phase of the exterior noise. In addition, the method may comprise generating an out of phase sound, based at least in part on the calculated out of phase signal, configured to cancel exterior noise, wherein the generated out of phase sound propagates at least in part in the first direction of the transmission path.

By generating an out of phase sound which propagates in the same direction as the exterior noise, the out of phase sound is configured to cancel the exterior noise in this direction. The present invention provides an active noise canceling method, capable of reacting to the measured exterior noise, by generating the out of phase sound based on measuring the exterior noise and based on calculating out of phase signal.

According to a further aspect, calculating the out of phase signal, may be further based at least on one of incident waves, system characteristics, vehicle exterior acoustics, position of means for generating the out of phase sound, position of means for measuring the amplitude and phase of the exterior noise and/or an acoustic transmission path of the exterior noise.

According to a further aspect, calculating may be based at least in part on vehicle exterior acoustics, which may be calibrated for the vehicle.

The use of vehicle exterior acoustics, calibrated for the vehicle, for calculating further leads to an improved active noise cancelling efficiency.

According to a further aspect, calculating the out of phase signal may require a computational time, which is smaller than a transit time needed by the exterior noise, to arrive at a position where the out of phase sound is generated.

In particular, the transit time represent the time span needed by the exterior noise to pass the distance between position where the out of phase sound is measured and the position where the out of phase sound is generated.

Advantageously, if the computational time for calculating the out of phase signal is smaller than the transit time, the out of phase signal can be provided before the exterior noise passes the position where the out of phase sound is generated. Thus, the out of phase sound can be generated, at the same time as the exterior noise passes the position where the out of phase sound is generated.

According to another aspect, the invention provides a computer program comprising instructions which, when the program is executed by a computer, cause the computer to carry out a method for active noise cancellation according to any of the above aspects.

Further benefits and advantages of the present invention will become apparent after a careful reading of the detailed description with appropriate reference to the accompanying drawings.

DETAILED DESCRIPTION

The present disclosure provides a system, method and computer program for vehicle exterior noise reduction. The system and method according to this disclosure offer many advantages. The invention allows to cancel exterior noise (e.g. tire noise contribution) by generating an out of phase sound with respect to the sound generated by the exterior noise source. In particular, the present invention provides a system, method and computer program configured to cancel exterior noise on an opposite site of a vehicle with respect to the exterior noise source.

Figure 1:
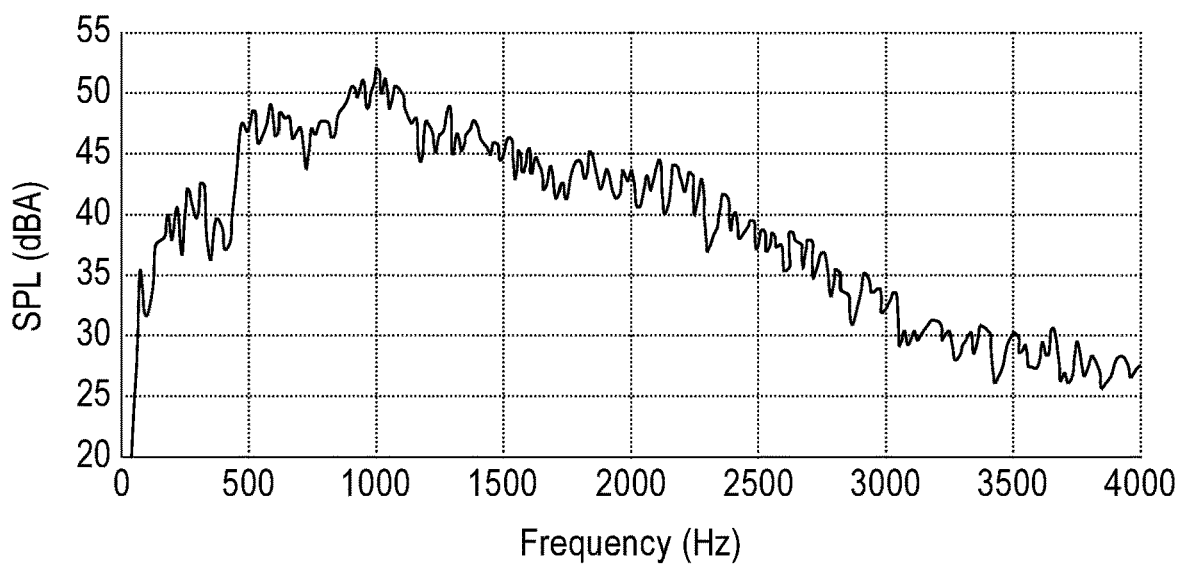
FIG. 1 illustrates a typical Pass-by-Noise tire noise spectrum.

FIG. 1 illustrates a typical Pass-by-Noise (PbN) tire noise spectrum. Tire exterior noise is generated by tire-road interaction during rolling and propagates through the air toward the exterior of a vehicle. The exterior noise level has a significant impact on environment and is quantified through a standard test method like PbN test. Therefore, in order to describe the overall acoustic signature of a vehicle, the vehicle is measured in motion, by passing fixed microphones. In a typical PbN test the tire noise spectrum has a higher energy content in the frequency range of 500 to 2,000 Hz related to specific noise mechanisms in this band (pattern noise, pipe resonance, stick-slip).

Figure 2:
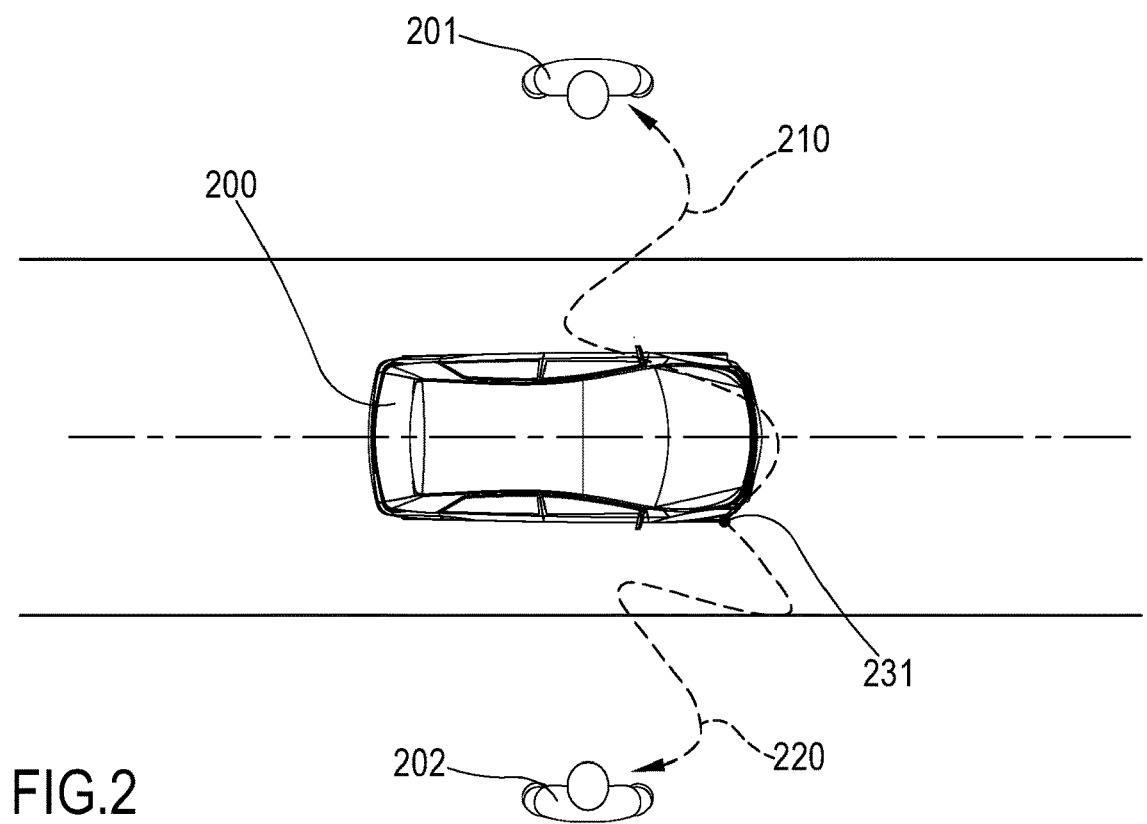
FIG. 2 illustrates two lateral transmission paths for exterior noise regarding a vehicle according to an embodiment of the invention.

FIG. 2 illustrates two lateral transmission paths for exterior noise regarding a vehicle according to an embodiment of the invention. In general, a tire emits noise in all directions, wherein the amplitude of the noise depends on the directivity. The invention focuses on two lateral transmission paths that are of particular interest for exterior noise cancelling (e.g. for passers-by) i.e., the air paths from the tire source to an exterior noise receiver, should be considered. FIG. 2 shows an exemplary transmission path from an exterior noise source 231 (e.g. tire surface) to an exterior receiver 202 (e.g. exterior microphone) of the vehicle 200, which corresponds to the direct path 220. In the direct path 220, the exterior receiver 202 and the exterior noise source 231 are on the same side of the vehicle 200. This contribution can be hardly reduced by active cancelling technologies since it is no possible to place any means for measuring (e.g. sensor, microphone)/means for calculating (e.g. controller)/means for generating (e.g. speaker) system between the exterior noise source 231 and the exterior receiver 202.

An advantage of such an approach is that the noise level on the lateral side of a vehicle is considerably reduced. At the same time, the sound experience of the driver may not be affected by the system for vehicle exterior noise reduction. Moreover, the exterior noise of the vehicle in directions other than the lateral direction is not cancelled. Therefore, on one hand, undesired exterior noise is reduced while noise in other desired directions is maintained. This is particularly important in connection with other road users such as cyclists or pedestrians (especially distracted people, children or disabled people, e.g. blind people) who rely on road noise in order to perceive approaching vehicles (especially from out of sight directions).

In particular, FIG. 2 shows a transmission path from an exterior noise source 231 (e.g. tire) to an exterior receiver 201 on the opposite side of the vehicle 200, which corresponds to the opposite side path 210. For example, the exterior noise generated by the front right tire propagates toward the left-side of the vehicle. The exterior noise passes the vehicle underbody, where the exterior noise can be attenuated with sound cancelling technique. In general, tire contribution on the opposite side can be relevant for overall exterior noise of the vehicle.

Note that while in FIG. 2 the transmission path is shown to an exterior receiver on a lateral opposite side of the vehicle, the same principle applies if noise is considered (and intended to be cancelled) in the longitudinal direction of the vehicle. For example, the exterior noise generated by the front right tire propagates toward the rear side of the vehicle. The exterior noise passes the vehicle underbody, where the exterior noise can be attenuated with the described sound cancelling technique. The active noise cancellation in different directions may be controlled based on different traffic scenarios (e.g. based at least in part on vehicle speed or GPS data). For example, at low speeds, noise cancellation in front of and behind the vehicle may be disabled (in order to improve road safety for cyclists and pedestrians) while at higher speeds, noise cancellation in front of and behind the vehicle may be activated (for example on congested highways within a metropolitan area).

Figure 3:
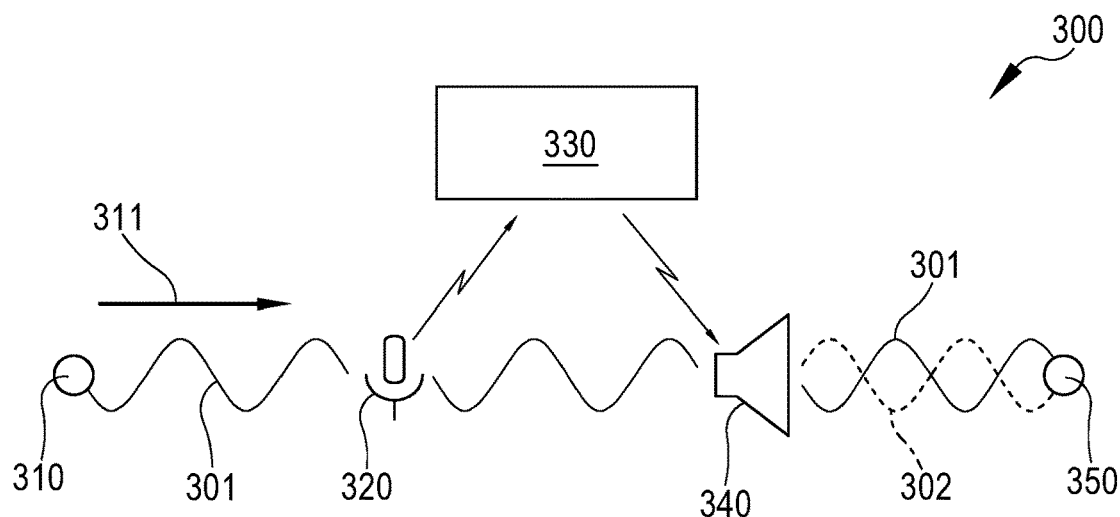
FIG. 3 illustrates an active noise cancelling system according to embodiments of the invention.

FIG. 3 illustrates an active noise cancelling system according to an embodiment of the invention.

In some embodiments, the active noise cancelling system 300 may reduce undesired exterior noise 301 by generating out of phase sound 302 with respect to incident waves of exterior noise 301. In addition, the active noise cancelling system 300 may comprise means for measuring 320 exterior noise 301, and means for calculating 330 an out of phase signal. The out of phase signal is then used, by the means for generating 340, to generate out of phase sound to cancel the exterior noise 301.

The exterior noise 301 propagates at least in part in a first direction (indicated with an arrow 311 in FIG. 3) from at least one exterior noise source 310. The means for measuring 320 measures amplitude and phase of exterior noise 301, which propagates at least in part in the first direction 311 from the at least one exterior noise source 310. Then, the means for calculating 330 uses the measured amplitude and phase of the exterior noise 301 to calculate an out of phase signal. The calculated out of phase signal is used by the means for generating 340 to generate the out of phase sound 302, wherein the generated out of phase sound 302 propagates at least in part in the first direction 311 from the exterior noise source. The first direction may be perpendicular or substantially perpendicular to the direction of travel of the vehicle within a plane created by the underbody of the vehicle. Thus, the generated out of phase sound 302 is configured to cancel the exterior noise 301 by interference.

In FIG. 3, the means for generating 340 is located between an exterior receiver 350 and the exterior noise source 310. As a consequence, the exterior receiver 350 perceives no or at least a significantly reduced exterior noise sound. The embodiment illustrated in FIG. 3 provides an active noise cancelling system 300, which generates an out of phase sound based on reacting to a measured exterior noise.

In a further embodiment the generated out of phase sound depends not only on the measured exterior noise but also on additional parameters. In particular, the means for calculating may calculate the out of phase signal, based at least on one of incident waves, system characteristics, vehicle exterior acoustics, position of the means for generating the out of phase sound, position of the means for measuring and/or an acoustic transmission path of the exterior noise.

Figure 4:
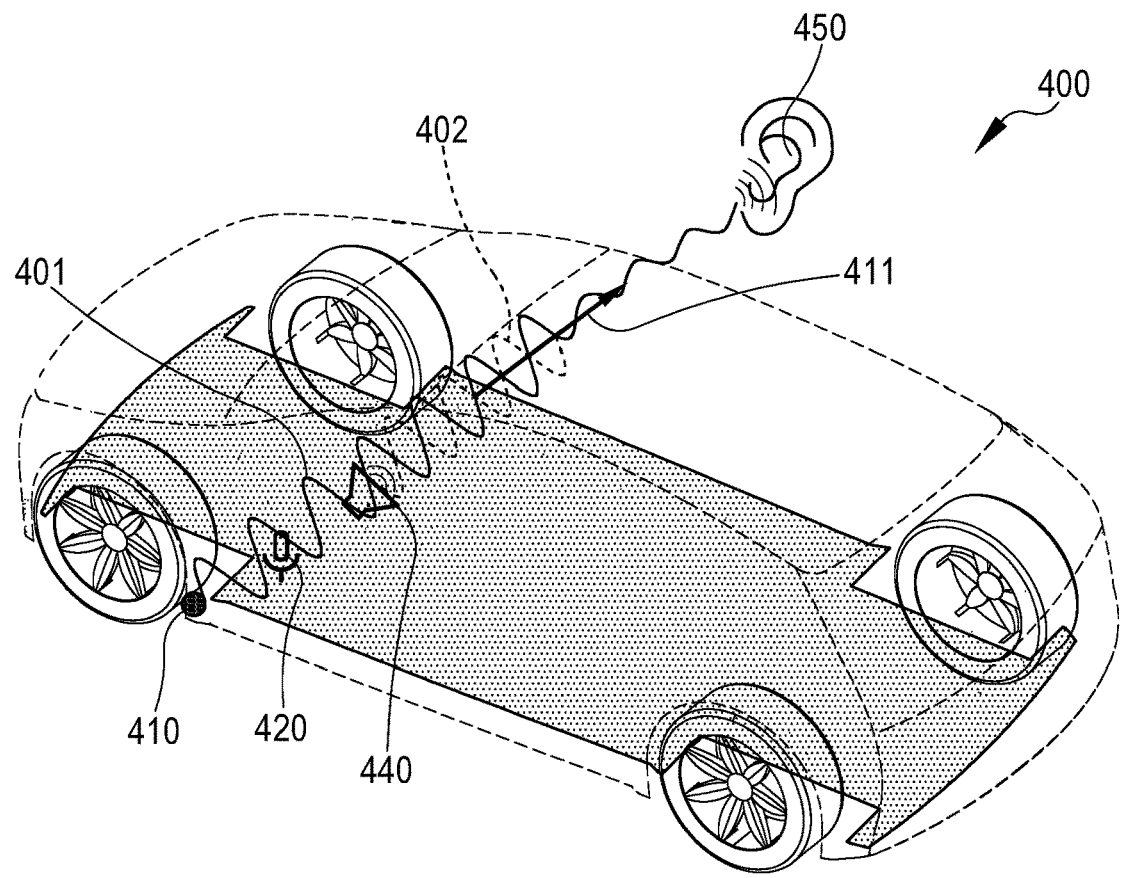
FIG. 4 illustrates an active noise cancelling system according to embodiments of the invention.

FIG. 4 depicts an active noise cancelling system according to embodiments of the invention. In particular, FIG. 4 illustrates a system for active canceling of tire exterior noise, where the front left tire 410 contribution is considered as the only noise source. This concept may also be extended to additional tire source contributions.

The system for vehicle exterior noise reduction according to FIG. 4 comprises means for measuring 420 of amplitude and phase of exterior noise, which propagates at least in part in a first direction (indicated with an arrow 411 in FIG. 4) from at least one exterior noise source 410 of a vehicle 400, having an acoustic transmission path, wherein the exterior noise 401 propagates at least in part under an underbody of the vehicle 400. The system further comprises means for calculating an out of phase signal (not explicitly shown in FIG. 4) based at least in part on the measured amplitude and phase of the exterior noise 401 and means for generating 440 an out of phase sound 402, based at least in part on the calculated out of phase signal, configured to cancel exterior noise 401, wherein the generated out of phase sound 402 propagates at least in part in the first direction 411 of the transmission path.

As shown in FIG. 4, the exterior noise 401 propagates at least in part to an opposite side of the vehicle 400 by passing the underbody of the vehicle. In this particular embodiment, the generated out of phase sound 402 propagates at least in part in the first direction 411 of the transmission path, at least in part under the vehicle underbody.

As illustrated in FIG. 4 the exterior noise propagates from the exterior noise source 410 to an exterior receiver 450, wherein the exterior receiver 450 is located on the opposed side of the vehicle compared to the vehicle side having the exterior noise source 410. Thus, a configuration of means for measuring, means for calculating and means for generating can be arranged to cancel the exterior noise at the exterior receiver position.

According to a further embodiment, the means for measuring 420 may comprise a microphone.

According to a further embodiment, the means for calculating may comprise a controller.

According to a further embodiment, the means for generating 440 may comprise a speaker.

In FIG. 4, the means for measuring 420 is located along the first direction 411 of the transmission path at a position on the underbody of the vehicle. Further, the means for measuring 420 is placed close to the tire 410 (e.g. wheel house) and intercepts tire noise measuring amplitude and phase.

In FIG. 4, the means for generating 440 is located along the first direction 411 of the transmission path and is positioned on the underbody of the vehicle 400.

According to another embodiment, the means for generating may be located at a wheel arch edge, at a fender, at a bumper edge, or at a side of vehicle. Generally, the location of the position of the means for generating depends on the direction into which the out of phase sound should primarily be transmitted, while at the same time ensuring a safe position on the vehicle, e.g. protected from exterior sources of damage.

In general, one or more means for generating can be used for active noise cancelling. The use of multiple means for generating may allow having more complex sound directivity pattern (e.g. use of dipole or quadrupole vs. monopole) having more than one preferential direction. In particular, the position(s) and/or the used number of means for generating, or in other words the layout created by the means for generating the out of phase sound(s), may be the result of an optimization/calibration process where different layouts are evaluated aiming at minimizing noise at an exterior receiver position. Layout optimization may be aided by numerical simulation. In particular, depending on the complexity of sound field, more means for generating (e.g. speakers) might be required. The sound field depends on frequency, wherein the complexity of a sound field increases with the frequency.

In some embodiments, the means for measuring 420 may be located between the means for generating 440 and the exterior noise source 410. Thereby, an active noise cancelling system is provided, which is configured to react to a certain noise and not only to predict a respective out of phase sound.

In the specific embodiment illustrated in FIG. 4, the means for generating 440 is placed between the source 410 (e.g. the tire) and the receiver 450 (i.e. the outdoor of the vehicle). This configuration allows for reactive noise cancelling on the "opposite side" of the vehicle, wherein the exterior noise has to propagate at least in part under the underbody of the vehicle.

According to some embodiments, the means for calculating may receive a measured signal and calculates an out of phase signal taking into account incident waves, speaker position and acoustic transmission path under the vehicle.

According to a further embodiment, calculating may be based at least in part on vehicle exterior acoustics, which are calibrated for the vehicle 400. Calibrating the vehicle exterior acoustic is beneficial, as the noise cancelling depends not only on the relative position of the microphone 420/speaker 440 position, but also on the exterior acoustics of the vehicle 400 itself. In particular, for a given configuration of the means for measuring and the means for generating, calculating the out of wave sound must also take into account the vehicle and its exterior acoustic. Calibrating the vehicle exterior acoustics provides setting information for the means for calculating with respect to a specific vehicle-noise cancelling system. However, if the vehicle or the noise cancelling system configuration changes, a new calibration is required.

According to another embodiment, the means for calculating may calculate the out of phase signal in a computational time, which may be smaller than a transit time needed by the exterior noise, to arrive at the position of the means for generating 440. For calculating, computational time is critical since the out of phase signal should be calculated before the exterior noise sound wave reaches the speaker position 440 (i.e. computational time<microphone-speaker-distance/sound speed). For instance, considering a distance of 0.5 m from microphone to speaker the computational time should be less than 1.5 ms.

Figure 5:
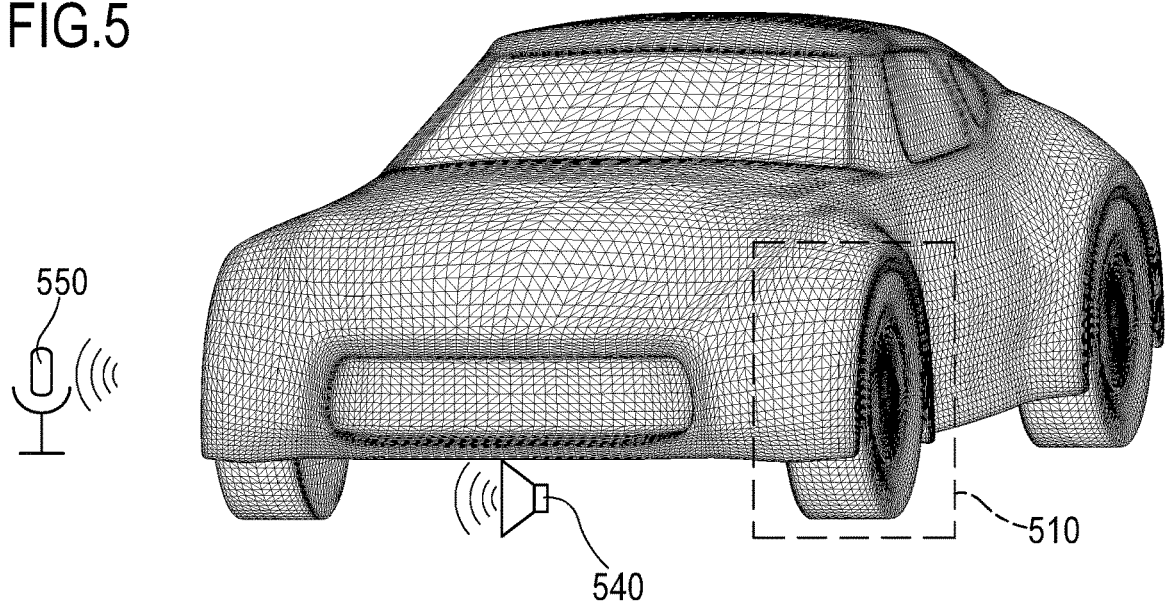
FIG. 5 shows a typical finite element method (FEM) acoustic tire and vehicle simulation model.

FIG. 5 shows a typical finite element method (FEM) acoustic tire and vehicle simulation model. In particular the simulation aims at reproducing a sound field (in terms of amplitude/phase and directivity) generated by a tire. The sound field is calculated starting from a complex vibration field of the tire (dedicated tire FEM simulation including all pattern construction feature) that therefore represent boundary condition of the simulation itself. The noise is then propagated in space considering the interaction with the vehicle. Specific FEM acoustic techniques might be used (e.g. making use of Perfectly Matching Layer or equivalent in such a way that only a thin layer of air has to be modelled). The ground is modelled as perfectly reflecting plane (but some impedance properties could be given as well) such as the external vehicle surface. The simulation will allow to visualize the sound field propagated under the vehicle and to quantify the efficacy of a noise canceling device. In FIG. 5, the model can be used to illustrate an exemplary simulated active control system by simulating tire noise 510, which propagates to an exterior receiver 550 and by simulating out of wave sound generated by means for generating 540.

Figure 6:
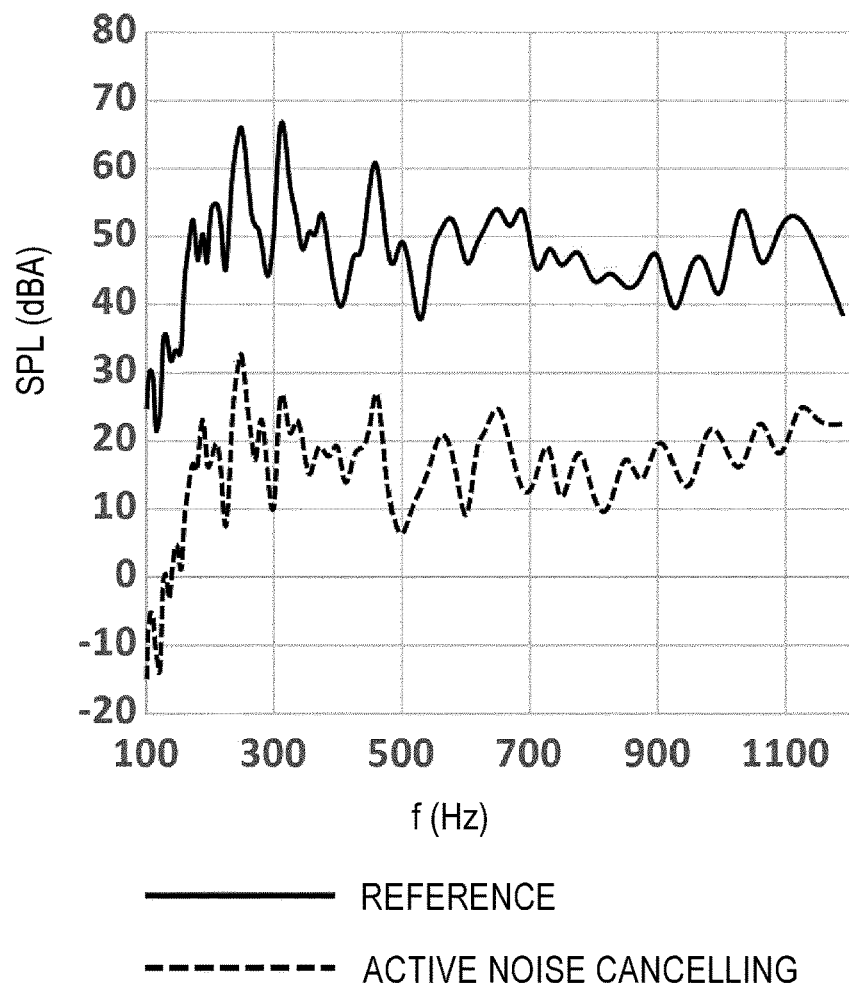
FIG. 6 illustrates results of acoustic simulation.

FIG. 6 shows the results of acoustic simulation. The solid line represents the spectrum of the exterior receiver 550 (e.g. target microphone), due to the tire noise 510. The dashed line illustrates the spectrum of the exterior receiver 550, taking into account the noise of the tire and the out of wave noise of the means for generating 540. In this case, the means for generating 540 has been simulated as a monopole source positioned in the vehicle underbody and generated a noise with equal amplitude and opposite phase with respect to tire noise 510.

Figure 7:
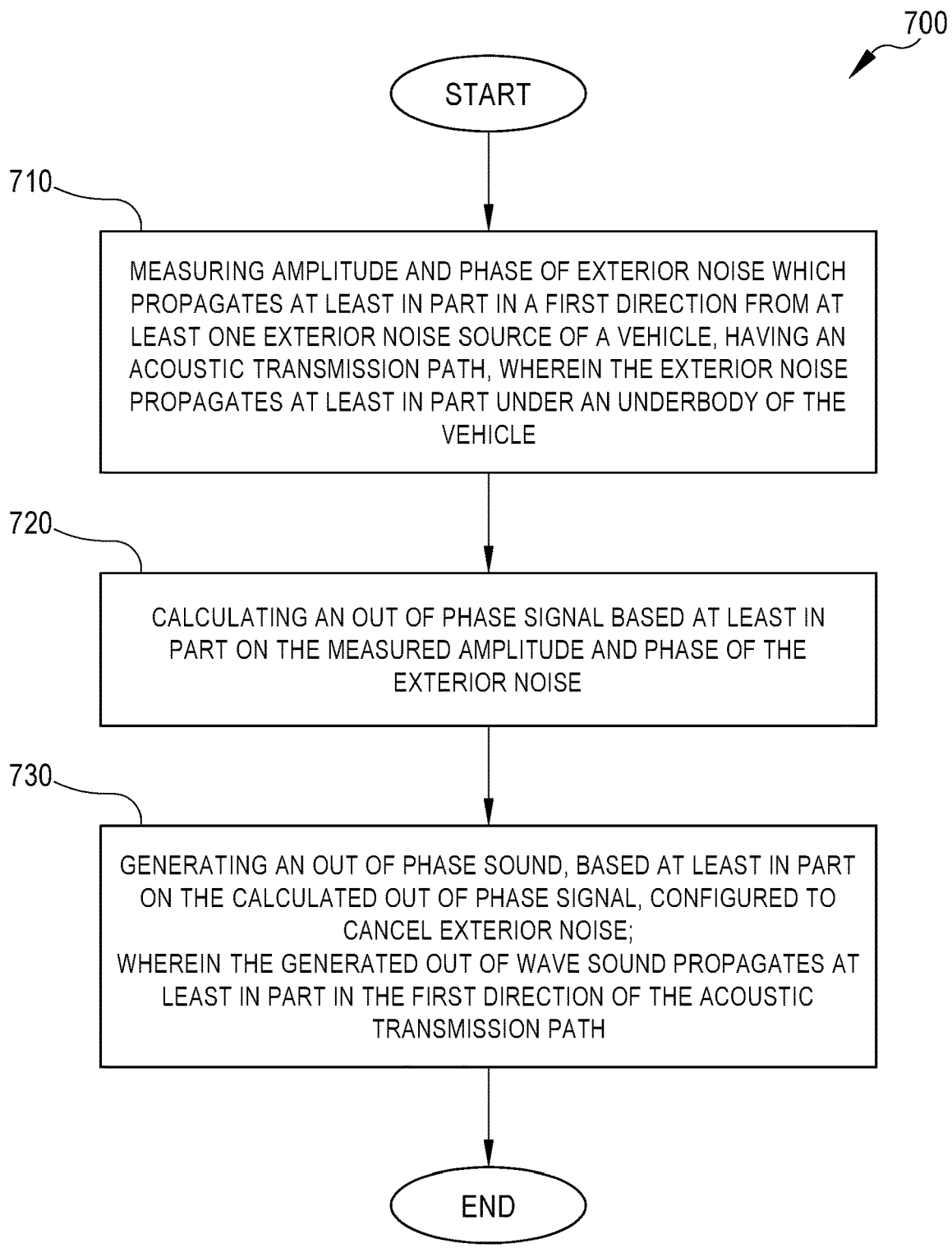
FIG. 7 shows a flow diagram illustrating a method for vehicle exterior noise reduction according to embodiments of the present disclosure.

FIG. 7 shows a flow diagram 700 illustrating a method for vehicle exterior noise reduction according to embodiments of the present disclosure.

The method shown in FIG. 7 is for illustration only. In step 710, amplitude and phase of exterior noise is measured, which propagates at least in part in a first direction from at least one exterior noise source of a vehicle, having an acoustic transmission path, wherein the exterior noise propagates at least in part under an underbody of the vehicle.

In a further step 720, an out of phase signal is calculated, based at least in part on the measured amplitude and phase of the exterior noise. In some embodiments, calculating the out of phase signal, may be further based at least on one of incident waves, system characteristics, vehicle exterior acoustics, position of means for generating the out of phase sound, position of means for measuring the amplitude and phase of the exterior noise and/or an acoustic transmission path of the exterior noise. In some additional embodiments, calculating may be based at least in part on vehicle exterior acoustics, which may be calibrated for the vehicle. In some further embodiments, calculating the out of phase signal may require a computational time, which is smaller than a transit time needed by the exterior noise, to arrive at a position where the out of phase sound is generated.

In a further step 730, an out of phase sound is generated, based at least in part on the calculated out of phase signal, configured to cancel exterior noise, wherein the generated out of phase sound propagates at least in part in the first direction of the transmission path.

LIST OF REFERENCE SIGNS AS USED IN THE DRAWINGS

200; 400: vehicle
201; 202; 350; 450, 550: exterior receiver
210: opposite side path
220: direct path
231; 310; 410, 510: exterior noise source/tire noise
301; 401: exterior noise
302; 402: out of phase sound
311; 411: first direction
320; 420: means for measuring
330; 430: means for calculating
340; 440, 540: means for generating

The invention claimed is:

1. A system for vehicle exterior noise reduction, comprising:
    means for measuring amplitude and phase of exterior noise, which propagates at least in part in a first direction from at least one exterior noise source of a vehicle, having an acoustic transmission path, wherein the exterior noise propagates at least in part under an underbody of the vehicle and in the first direction to an opposite side of the vehicle with respect to the at least one exterior noise source;
    means for calculating an out of phase signal based at least in part on the measured amplitude and phase of the exterior noise; and
    means for generating an out of phase sound, based at least in part on the calculated out of phase signal, configured to cancel the exterior noise in the first direction, wherein the means for measuring is located at a position on the underbody of the vehicle, and wherein the first direction is perpendicular or substantially perpendicular to a direction of travel of the vehicle within a plane created by the underbody of the vehicle;
    wherein the means for generating an out of phase sound is positioned such that the generated out of phase sound is primarily transmitted in the first direction of the acoustic transmission path.

2. The system of claim 1, wherein the exterior noise source is a tire of the vehicle, configured to generate exterior noise by tire-road interaction.

3. The system of claim 1, wherein the means for measuring is further located along the first direction of the acoustic transmission path.

4. The system of claim 1, wherein the means for measuring is located between the means for generating and the exterior noise source, and/or the means for measuring is located closer to the exterior noise source than the means for generating.

5. The system of claim 1, wherein the system further comprises:
    second means for measuring amplitude and phase of the exterior noise, which propagates at least in part in a second direction from the at least one exterior noise source of the vehicle, having the acoustic transmission path, wherein the exterior noise propagates at least in part under the underbody of the vehicle,
    wherein the means for calculating the out of phase signal are configured to calculate a further out of phase signal based at least in part on the measured amplitude and phase of the exterior noise propagating in the second direction; and/or
    second means for generating a further out of phase sound, based at least in part on the calculated further out of phase signal, configured to cancel exterior noise,
    wherein the generated further out of phase sound propagates at least in part in the second direction of the acoustic transmission path.

6. The system of claim 1, wherein the means for calculating further calculates the out of phase signal, based at least on one of incident waves, system characteristics, vehicle exterior acoustics, position of the means for generating the out of phase sound, position of the means for measuring and/or an acoustic transmission path of the exterior noise.

7. The system of claim 1, wherein calculating of the out of phase signal is based at least in part on vehicle exterior acoustics, which are calibrated for the vehicle.

8. The system of claim 1, wherein the means for calculating calculates the out of phase signal in a computational time, which is smaller than a transit time needed by the exterior noise, to arrive at the position of the means for generating.

9. A method for vehicle exterior noise reduction, comprising:
    measuring amplitude and phase of exterior noise which propagates at least in part in a first direction from at least one exterior noise source of a vehicle, having an acoustic transmission path, wherein the exterior noise propagates at least in part under an underbody of the vehicle and in the first direction to an opposite side of the vehicle with respect to the exterior noise source;
    calculating an out of phase signal based at least in part on the measured amplitude and phase of the exterior noise; and
    generating an out of phase sound, based at least in part on the calculated out of phase signal, configured to cancel the exterior noise in the first direction, wherein the amplitude and phase of exterior noise are measured at a position on the underbody of the vehicle, and wherein the first direction is perpendicular or substantially perpendicular to a direction of travel of the vehicle within a plane created by the underbody of the vehicle;
    wherein the generating out of phase sound is positioned such that the generated out of phase sound is primarily transmitted in the first direction of the acoustic transmission path.

10. The method of claim 9, further comprising:
    measuring amplitude and phase of the exterior noise which propagates at least in part in a second direction from the at least one exterior noise source of the vehicle, having the acoustic transmission path, wherein the exterior noise propagates at least in part under the underbody of the vehicle;

calculating a further out of phase signal based at least in part on the measured amplitude and phase of the exterior noise propagating in the second direction;

generating a further out of phase sound, based at least in part on the calculated further out of phase signal, configured to cancel exterior noise;

wherein the generated further out of phase sound propagates at least in part in the second direction of the acoustic transmission path.

11. The method of claim 9, wherein:

calculating of the out of phase signal is further based at least on one or more of incident waves, system characteristics, vehicle exterior acoustics, a position of a speaker for generating the out of phase sound, a position of a microphone for measuring the amplitude and phase of the exterior noise and/or an acoustic transmission path of the exterior noise.

12. The method of claim 9, wherein:

calculating of the out of phase signal is based at least in part on vehicle exterior acoustics, which are calibrated for the vehicle.

13. The method of claim 9, wherein;

calculating of the out of phase signal requires a computational time, which is smaller than a transit time needed by the exterior noise, to arrive at a position where the out of phase sound is generated.

14. A non-transitory computer program product comprising instructions which, when the program is executed by a processor, cause the processor to carry out operations comprising:

measuring amplitude and phase of exterior noise which propagates at least in part in a first direction from at least one exterior noise source of a vehicle, having an acoustic transmission path, wherein the exterior noise propagates at least in part under an underbody of the vehicle and in the first direction to an opposite side of the vehicle with respect to the exterior noise source;

calculating an out of phase signal based at least in part on the measured amplitude and phase of the exterior noise; and generating an out of phase sound, based at least in part on the calculated out of phase signal, configured to cancel the exterior noise in the first direction, wherein the amplitude and phase of exterior noise are measured at a position on the underbody of the vehicle, and wherein the first direction is perpendicular or substantially perpendicular to a direction of travel of the vehicle within a plane created by the underbody of the vehicle;

wherein the generating out of phase sound is positioned such that the generated out of phase sound is primarily transmitted in the first direction of the acoustic transmission path.

15. The non-transitory computer program product of claim 14, wherein the processor is caused to carry out operations further comprising:

measuring amplitude and phase of the exterior noise which propagates at least in part in a second direction from the at least one exterior noise source of the vehicle, having the acoustic transmission path, wherein the exterior noise propagates at least in part under the underbody of the vehicle;

calculating a further out of phase signal based at least in part on the measured amplitude and phase of the exterior noise propagating in the second direction;

generating a further out of phase sound, based at least in part on the calculated further out of phase signal, configured to cancel exterior noise;

wherein the generated further out of phase sound propagates at least in part in the second direction of the acoustic transmission path.

16. The non-transitory computer program product of claim 14, wherein:

calculating of the out of phase signal is further based at least on one or more of incident waves, system characteristics, vehicle exterior acoustics, a position of a speaker for generating the out of phase sound, a position of a microphone for measuring the amplitude and phase of the exterior noise and/or an acoustic transmission path of the exterior noise.

17. The non-transitory computer program product of claim 14, wherein:

calculating of the out of phase signal is based at least in part on vehicle exterior acoustics, which are calibrated for the vehicle.

18. The non-transitory computer program product of claim 14, wherein:

calculating of the out of phase signal requires a computational time, which is smaller than a transit time needed by the exterior noise, to arrive at a position where the out of phase sound is generated.

* * * * *